(12) United States Patent
Clark

(10) Patent No.: US 6,927,864 B2
(45) Date of Patent: Aug. 9, 2005

(54) METHOD AND SYSTEM FOR DETERMINING DIMENSIONS OF OPTICALLY RECOGNIZABLE FEATURES

(75) Inventor: Bryan Kevin Clark, Mountain View, CA (US)

(73) Assignee: Xyratex Technology Limited, Havant-Hampshire (GB)

( * ) Notice: Subject to any disclaimer, the term of this patent is extended or adjusted under 35 U.S.C. 154(b) by 344 days.

(21) Appl. No.: 10/212,832

(22) Filed: Aug. 5, 2002

(65) Prior Publication Data

US 2004/0021877 A1 Feb. 5, 2004

(51) Int. Cl.$^7$ .............................................. G01B 11/06
(52) U.S. Cl. .................... 356/630; 356/614; 250/223 R; 250/559.36
(58) Field of Search ................................. 356/601–602, 356/608, 614, 622–625, 630–632; 250/223 R, 559.27, 559.36

(56) References Cited

U.S. PATENT DOCUMENTS

| | | | | |
|---|---|---|---|---|
| 3,892,492 A | * | 7/1975 | Eichenberger | 356/434 |
| 4,063,820 A | * | 12/1977 | Borgese | 356/625 |
| 4,105,925 A | * | 8/1978 | Rossol et al. | 250/559.37 |
| 4,112,309 A | * | 9/1978 | Nakazawa et al. | 250/559.24 |
| 4,286,149 A | * | 8/1981 | Ben-Nathan et al. | 250/223 R |
| 4,573,073 A | * | 2/1986 | Corby, Jr. | 348/26 |
| 5,659,396 A | * | 8/1997 | Mondie | 356/630 |
| 5,812,269 A | * | 9/1998 | Svetkoff et al. | 356/602 |

* cited by examiner

Primary Examiner—Hoa Q. Pham
(74) Attorney, Agent, or Firm—Mitch Harris Weiss, Moy & Harris, P.C.

(57) ABSTRACT

A method and system for determining dimensions of optically recognizable features provides a low-cost and efficient high speed/high resolution measurement system for determining surface feature dimensions. Multiple imaging subsystems are arranged at predetermined differing angles above a surface under test. A scanning subsystem moves either the imaging subsystems or the surface under test and a processor coupled to the imaging subsystems determines the height of a surface feature by determining the deviations between the outputs of the imaging systems as an edge of the surface feature passes within the optical paths of the imaging subsystems.

23 Claims, 9 Drawing Sheets

METHOD AND SYSTEM FOR DETERMINING DIMENSIONS OF OPTICALLY RECOGNIZABLE FEATURES

BACKGROUND OF THE INVENTION

1. Field of the Invention

This invention relates to optical inspection and measuring systems, and more specifically, to an optical system for measuring the dimensions of optically recognizable features.

2. Description of the Related Art

The most used technologies for measuring three-dimensional (3D) features include triangulation, stereo vision, focusing methods (including confocal microscopy), interferometry, and time of flight measurements. Each of these methods has a specific range of applications. The range of applications referred to in the present invention are closely related to triangulation and stereo-vision. Triangulation and stereo-vision are well known for their 3D measurement capabilities. Derivatives, like Moiré fringe detection techniques are also well known for use in surface inspection.

The above-listed methods are limited in two key ways. First, the dynamic range (defined as the measuring range divided by the resolution) is limited by the number of pixels in the detection sensor. Second, since the height information of a measured feature is embedded in the 2D projection of the entire image onto the sensor, a large amount of data collection is required for every image sample taken (the entire number of pixels in the sensor) to measure the height of only few points of interest. Therefore, data collection and image processing within the above-listed techniques are complicated and time consuming.

Therefore, it would be desirable to provide a method and system for determining the dimensions of optically recognizable features that is not limited by the resolution of the detection sensor. It would further be desirable to reduce the amount of data collection necessary to measure three-dimensional features.

SUMMARY OF THE INVENTION

The foregoing objectives are achieved in an optical method and system that measures the three-dimensional structure of optically recognizable features. The system includes multiple imaging subsystems aligned at differing predetermined angles with respect to a surface under inspection, a scanning subsystem for providing motion of the surface under test with respect to the imaging subsystems and a processor coupled to the imaging subsystems for synchronizing the images in the time domain to compute both the size and height of surface features of the surface under inspection in conformity with the deviations of outputs of the imaging subsystems as edges of the features move within the optical paths of the imaging subsystems.

The foregoing and other objects, features, and advantages of the invention will be apparent from the following, more particular, description of the preferred embodiment of the invention, as illustrated in the accompanying drawings.

DESCRIPTION OF EMBODIMENTS OF THE INVENTION

Figure 1A:
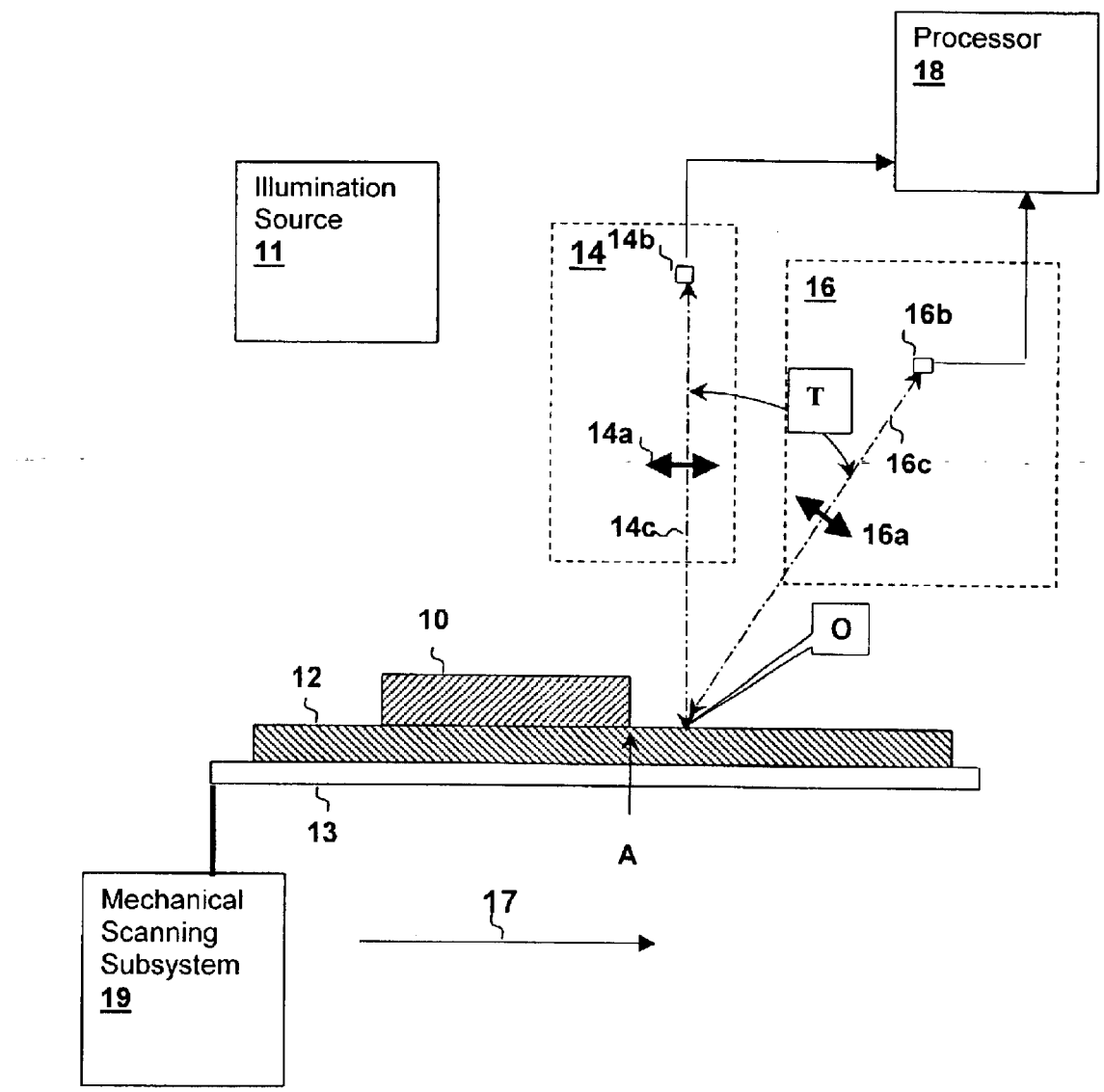
FIG. 1A is an illustration depicting a cross section of a surface under test by a system in accordance with a preferred embodiment of the invention.

With reference now to the figures, and in particular to FIG. 1A, a surface 12 under test by a system in accordance with an embodiment of the invention is depicted. Feature 10 is a feature within surface 12 to be measured. While the illustration depicts a single rectangle with a substantial height-to-width ratio, in practice, any feature of any shape can be measured provided it has a recognizable boundary.

A scanning platform 13, which can be a simple motional positioner, supports surface 12 and is used to move surface 12 through the optical paths of multiple imaging subsystems 14 and 16 along motional path 17. Imaging subsystems 14 and 16 include optics 14a and 16a required to image light scattered from surface 12 onto line detectors 14b and 16b as well as the virtual lines-of-site of imaging subsystems 14 and 16. Line detectors 14b and 16b are oriented with their resolution axes perpendicular to the page of the figure, and thus provide measurement of feature characteristics perpendicular to the page. Sight lines 14c and 16c represent the theoretical line of sight materialized by the optical axis of imaging subsystems 14 and 16. Only light generated from a point belonging to line of sight 14c or 16c will be imaged onto the line of site, and therefore, onto the detectors 14b and 16b, respectively. Illumination is provided by an illumination source 11 that provides lighting of surface 12. Illumination source 11 may be any suitable illuminating source, as no coherency or focusing requirement is implicit in the system of the present invention.

The illumination can be provided by a separate subsystem or the detectors may measure surface 12 using only the surrounding (ambient) light. If features on surface 12 are light emitters, then the method can be further used for 3D tracking of the light-emitting features. The purpose of illumination system 12 is to provide differentiation of the boundaries of feature 10 from the background portion of surface 12. The determination of variation of received light can be performed by any of the known techniques. The present invention operates on intensity variation of detected scattered light and therefore no coherent detection, interferometry or sectioning/focusing of the illumination source is needed. The present invention separates the detection of feature height into the time domain, by moving either surface under test 12 or imaging subsystems 14 and 16 and synchronizing the images detected by imaging subsystems 14 and 16 to determine the height of surface features. Alternatively, instead of moving the surface 12 or imaging systems 14 and 16, the surface image may be scanned (moved) relative to the detection systems, using one of many known image scanning techniques. For example, a plane mirror resonant scanner, a polygonal rotating mirror, or a multi-mirror sideways scanner (such as a corner cube arrangement) may be used to scan both lines of sight 14c and 16c, or a separate scanning system can be used for each line of sight, as long as the angular relationship between lines of sight are maintained (i.e., synchronized scanning). Any combination of scanning methods providing an optical synchronized scanning of the surface or the surface image is usable for the purpose of this invention.

Line detectors 14b and 16b project their resolution in a direction perpendicular to the direction of motion and provide width and length measurements that are tied to the resolution of the line detectors, but the height measurements are made by comparing the differences in time between the images detected by line detectors 14b and 16b in the direction of motion, and thus the height measurements are not limited by the resolution of line detectors 14b and 16b. Further, two-dimensional arrays can be used in place of line detectors 14b and 16b for providing measurement of length and width of surface features and mechanical scanning subsystem 19 may be configured to scan either the imaging subsystems or the surface under test in two axes, whereby height determination can be improved by detecting edges along both axes of motion. Similarly, instead of moving the surface, the image can be scanned relative to the imaging subsystems 14 and 16 according to known image scanning techniques.

Only two imaging subsystems 14, 16 are required to implement the techniques of the present invention, but the invention is not limited to systems using only two imaging subsystems. Imaging subsystems are generally linear optical sensing arrays such as CMOS linear arrays or CCDs (charge-coupled device arrays), but single detectors with a linear mask (slit) may be used when no surface (feature length and width) information is required. Use of linear arrays provides a rapid scanning capability that provides the system of the present invention with the ability to determine millions of points in three-dimensions quickly. Moreover, as will be seen later from the functional description, the height detection of the present invention provides a dramatic data reduction, since only the features out-of-plane of surface 12 will give a 3D signal.

A processor 18 (including the necessary circuitry to scan and convert the output of imaging subsystems 14 and 16 to a digital form), is coupled to imaging subsystems 14 and 16. The processor 18 includes a memory for storing program instructions for execution by an instruction unit and data values for manipulation by the program instructions. The program instructions for implementing portions of the method of the present invention include instructions for scanning the arrays within imaging subsystems 14 and 16, detecting edges of recognizable surface features and computing the height of surface features in conformity with a difference between the position of surface 12 when imaging subsystem 14 detects the edge of surface feature 10 and when imaging subsystem 16 detects the same edge.

The operation of the measurement system of the present invention will be described in a series of figures depicting the motion of surface 12 with respect to imaging subsystems 14 and 16. Referring again to FIG. 1A, surface 12 includes a boundary A. Position O represents the intersection of the theoretical lines of sight of the two imaging systems 14 and 16. Position O is the origin of the coordinates for measurements. At time T0, corresponding to the position of surface 12 in FIG. 1A, light scattering from surface 12 will be seen simultaneously by both imaging systems.

Figure 1B:
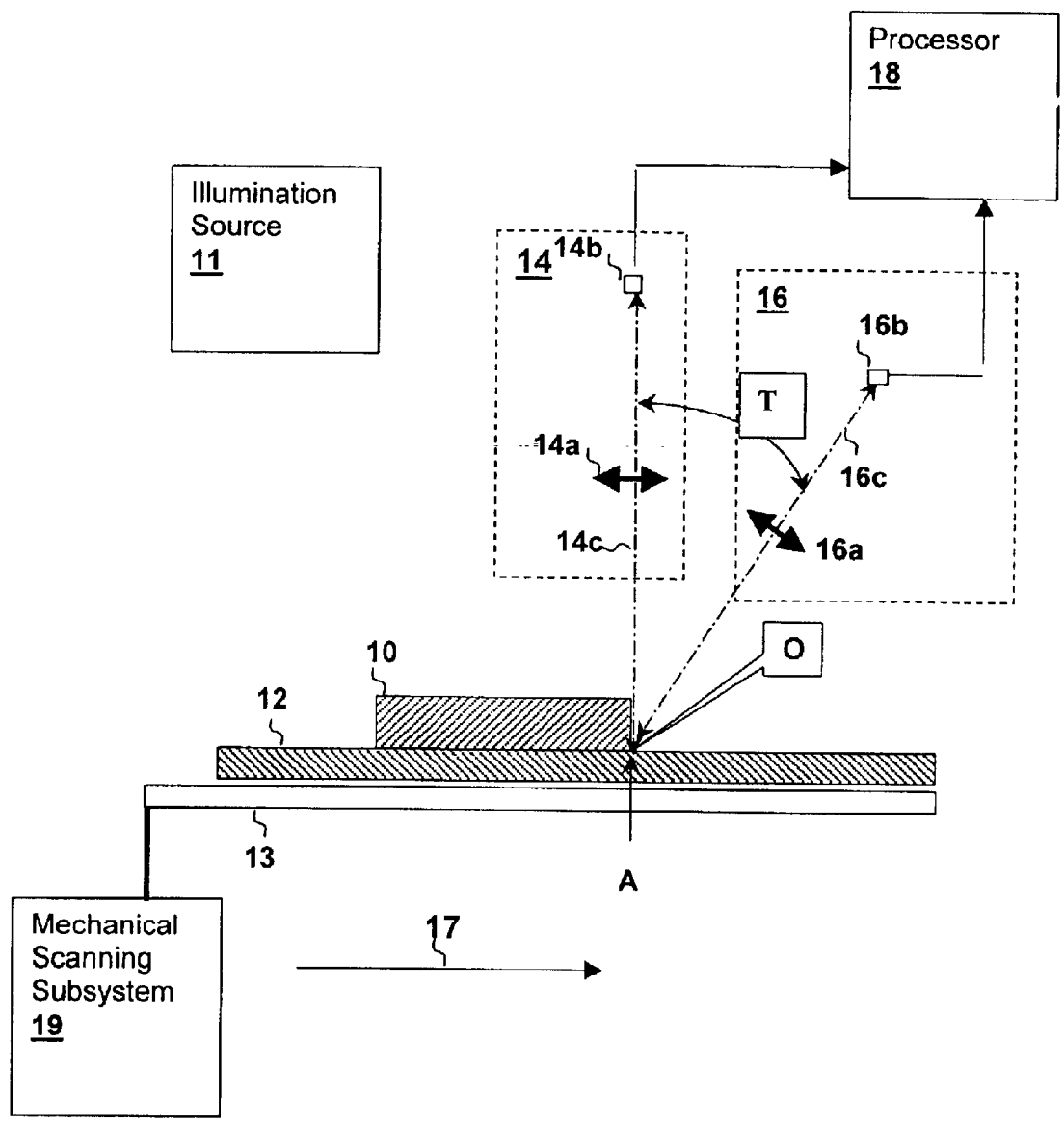
FIGS. 1B–1G are illustrations depicting a cross section of a surface under test by a system in accordance with an embodiment of the invention as the surface under test is moved over time.

Referring to FIG. 1B, at time T1, boundary A is now at Position O, resulting in a change in light level detected by both imaging systems. At this point in time and in the position of surface 12 with respect to imaging subsystems 14 and 16 when imaging system 14 sends a "start" (or "origin" or "triggering") signal to processor 18. The variation of the detected light level on both imaging systems 14 and 16 is related to the imaging of the lower corner of boundary A. The duration of the signals is therefore quite small for a mathematically "perfect" edge.

Figure 1C:
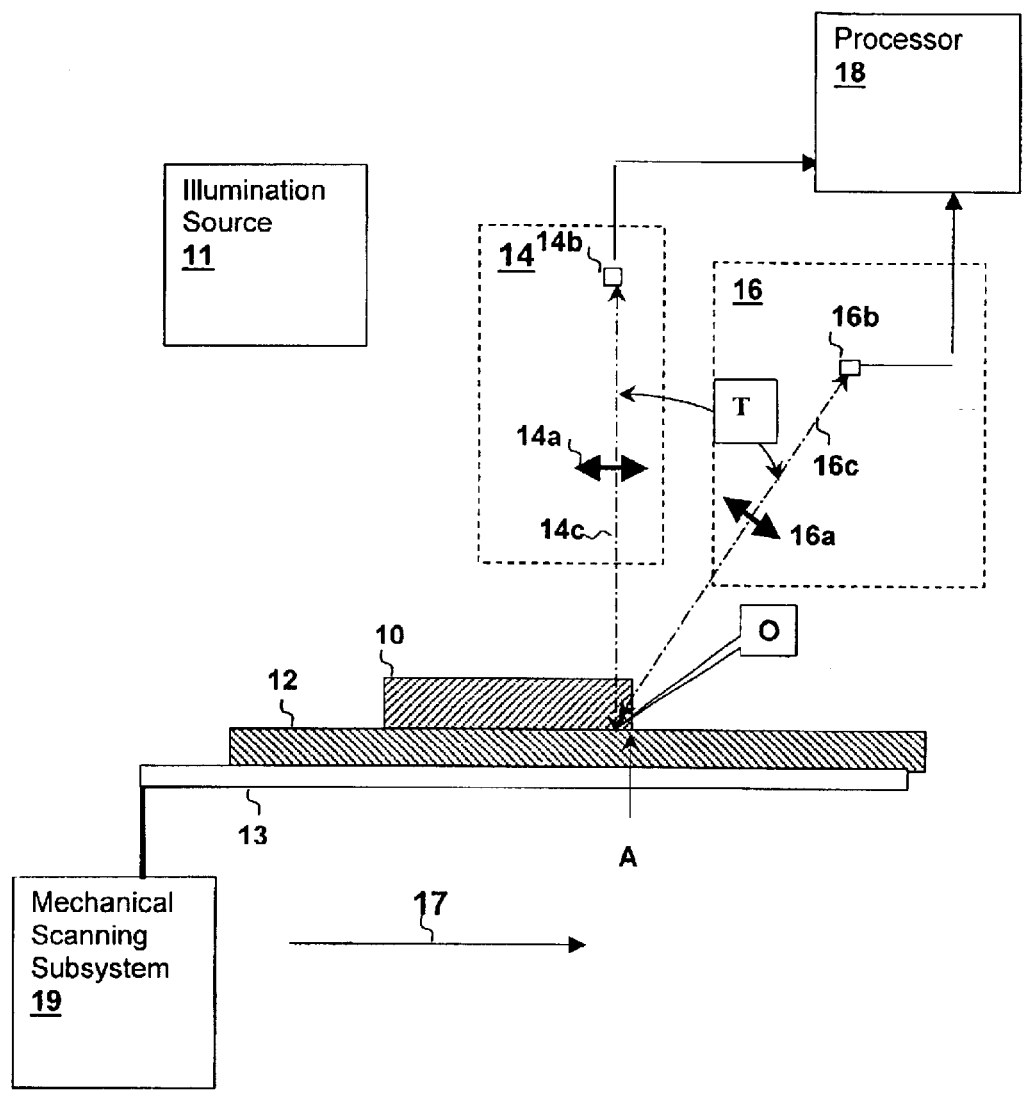

Referring to FIG. 1C, at time T2, as boundary A moves further in motional direction 17, light originating from boundary A will not image within the theoretical line of sight of imaging system 16, therefore resulting in a low amplitude at detector 16b given by the scattering from the vertical edge of feature 10. Light scattering from the surface of feature 10 along the theoretical line of sight of imaging system 14 returns to a steady amplitude as line of sight 14C has now reached the top of feature 10 at time T2. From time T1 to T2 neither of imaging subsystems 14 and 16 detects boundary A.

Figure 1D:
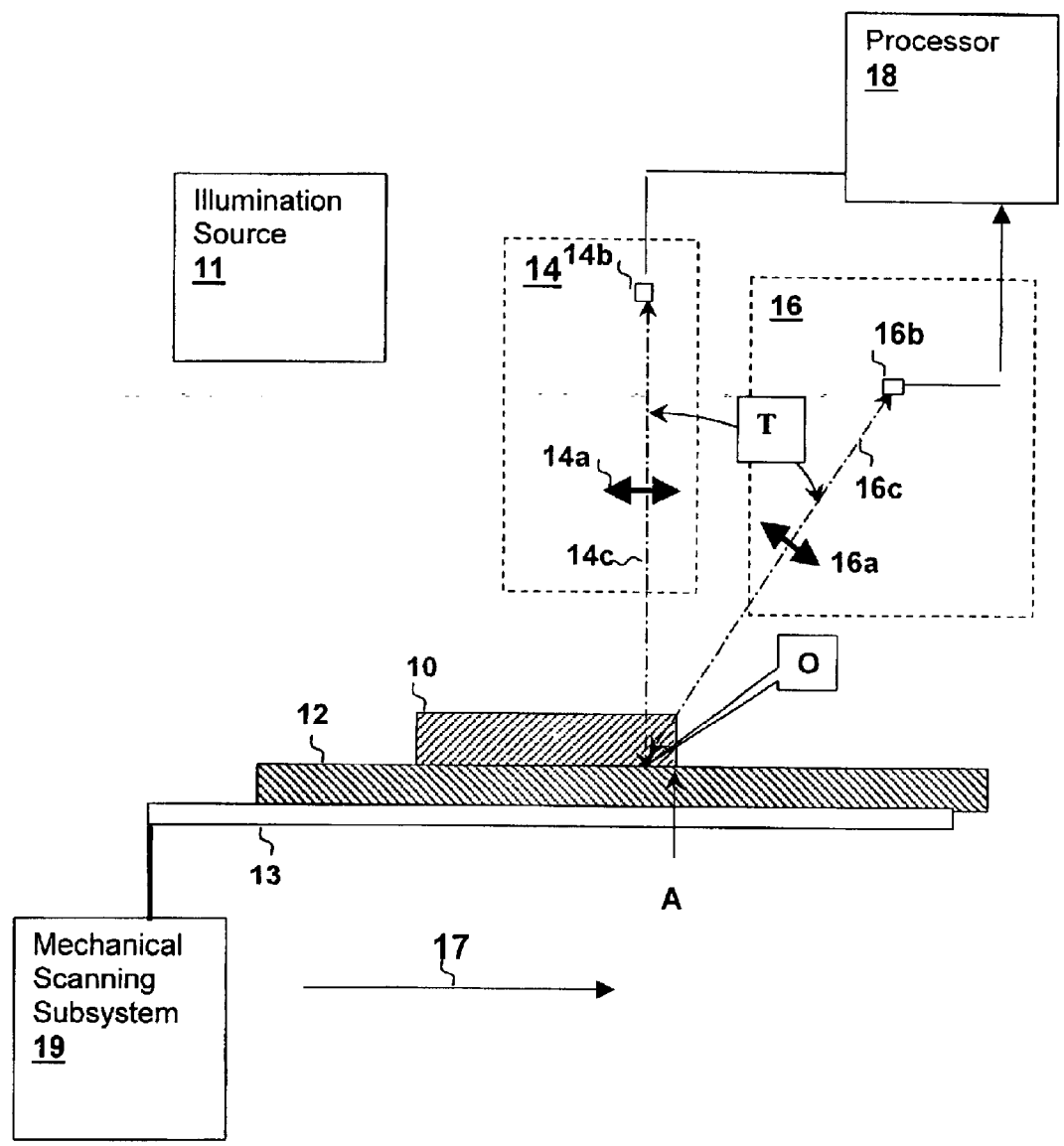
Figure 1E:
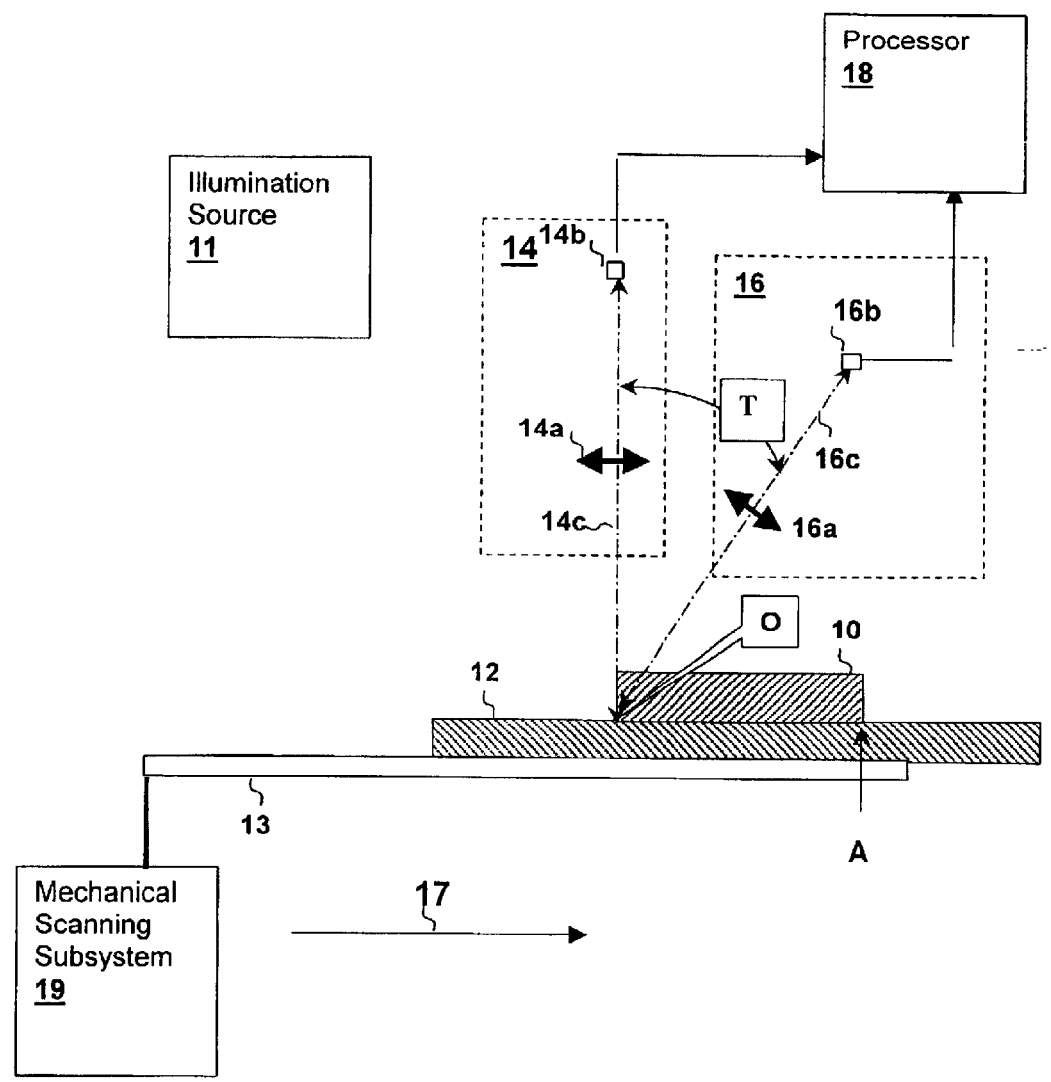

Referring to FIG. 1D, at time T3, when surface 12 reaches position C, then once again imaging subsystem 16 detects light amplitude from scattering from boundary A and there is no change in the light level detected by imaging subsystem 14. Referring to FIG. 1E, at time T4, imaging subsystem 14 detects a change in amplitude due to scattering from the edge of feature 10, while imaging subsystem 16 returns a constant level as line of sight 16c passes along the upper surface of feature 10.

Due to the time decomposition of the edge detection on the two imaging systems it is seen that the lateral size of feature 10 is given simply by the length of time that has elapsed (T4–T1) times the position change rate (positioner velocity) between FIG. 1B and FIG. 1E. In addition, since imaging system 16 is at a predetermined angle T with respect to surface 12, and that there is a known time difference between positions shown in FIG. 1B and FIG. 1D during which line of sight 16c is passing along edge A, the height of feature 10 (length of edge A) can be computed as H=positioner velocity times (T3−T1)/tan T, where T is the angle between the two optical axes (or the two lines of sight).

Figure 1F:
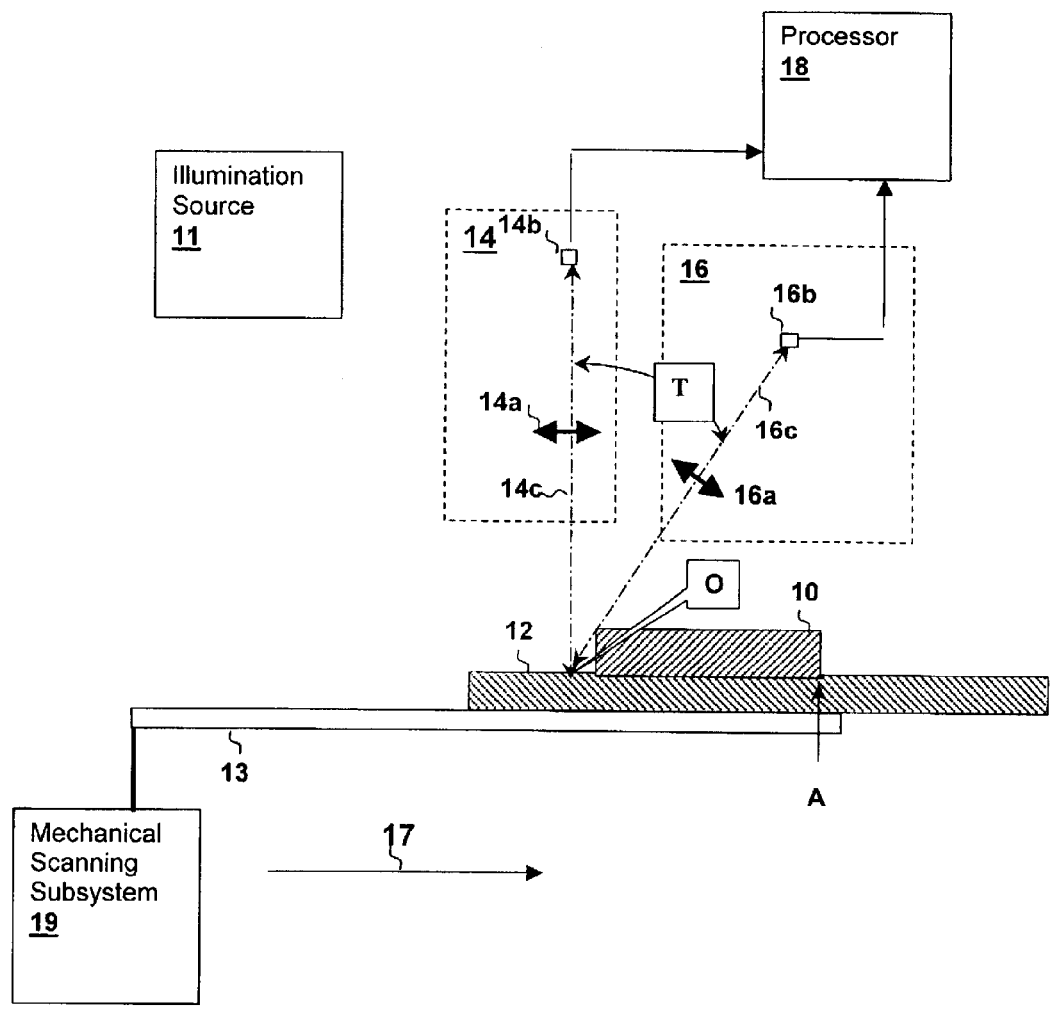
Figure 1G:
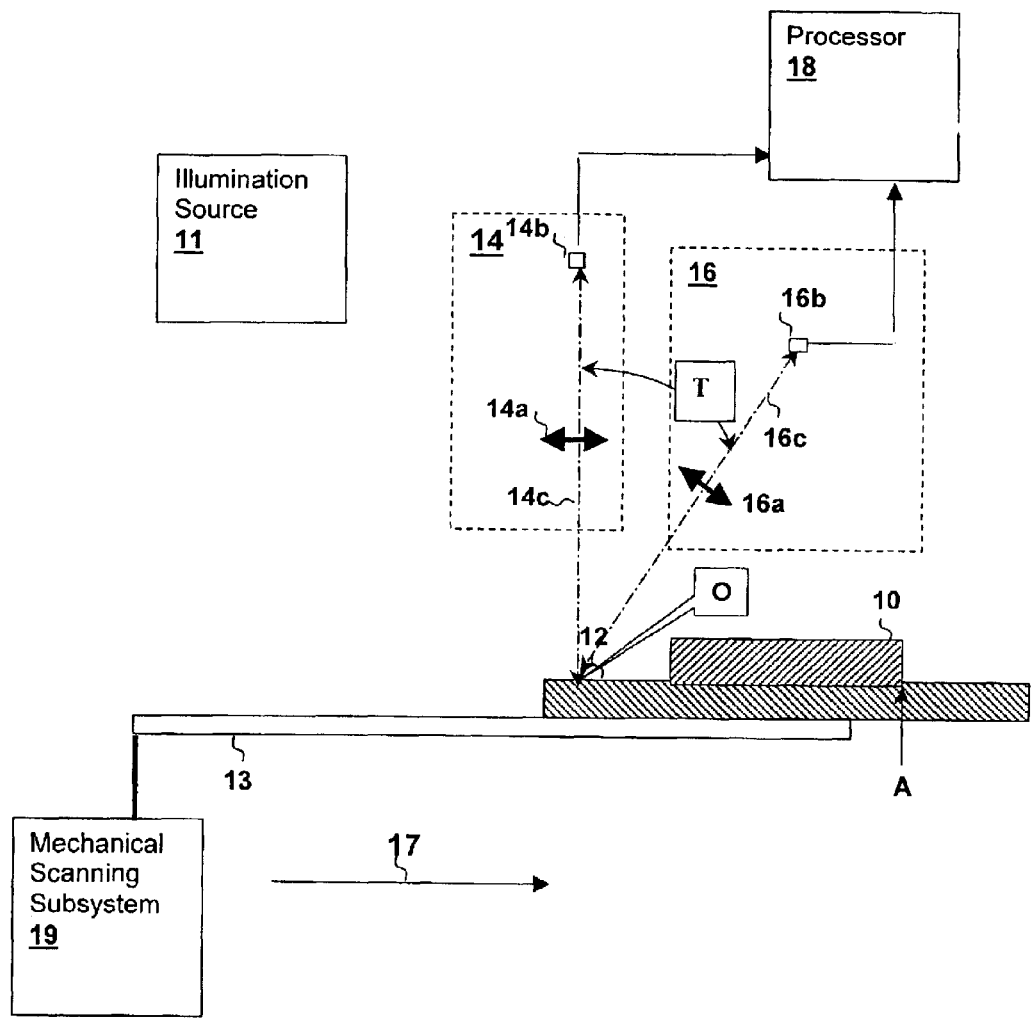

As positioning subsystem 19 continues to move, at time T5, depicted in FIG. 1F the output of line detector 16b changes due to scattering from the trailing edge of feature 10 and at time T6, as depicted in FIG. 1G the output of both imaging subsystems 14 and 16 return to a steady amplitude as line of sight 14c and 16c have now reached surface 12 (clear of feature 10) at time T6. In the illustrated example, the signal level from imaging subsystem 14 is used as a reference signal. The signal change from imaging subsystem 16 will lag a signal change from imaging subsystem 14 for a positive height deviation and lead a signal change from imaging subsystem 14 for a negative height deviation. The amount of lead or lag is proportional to the magnitude of the height deviation.

Figure 2:
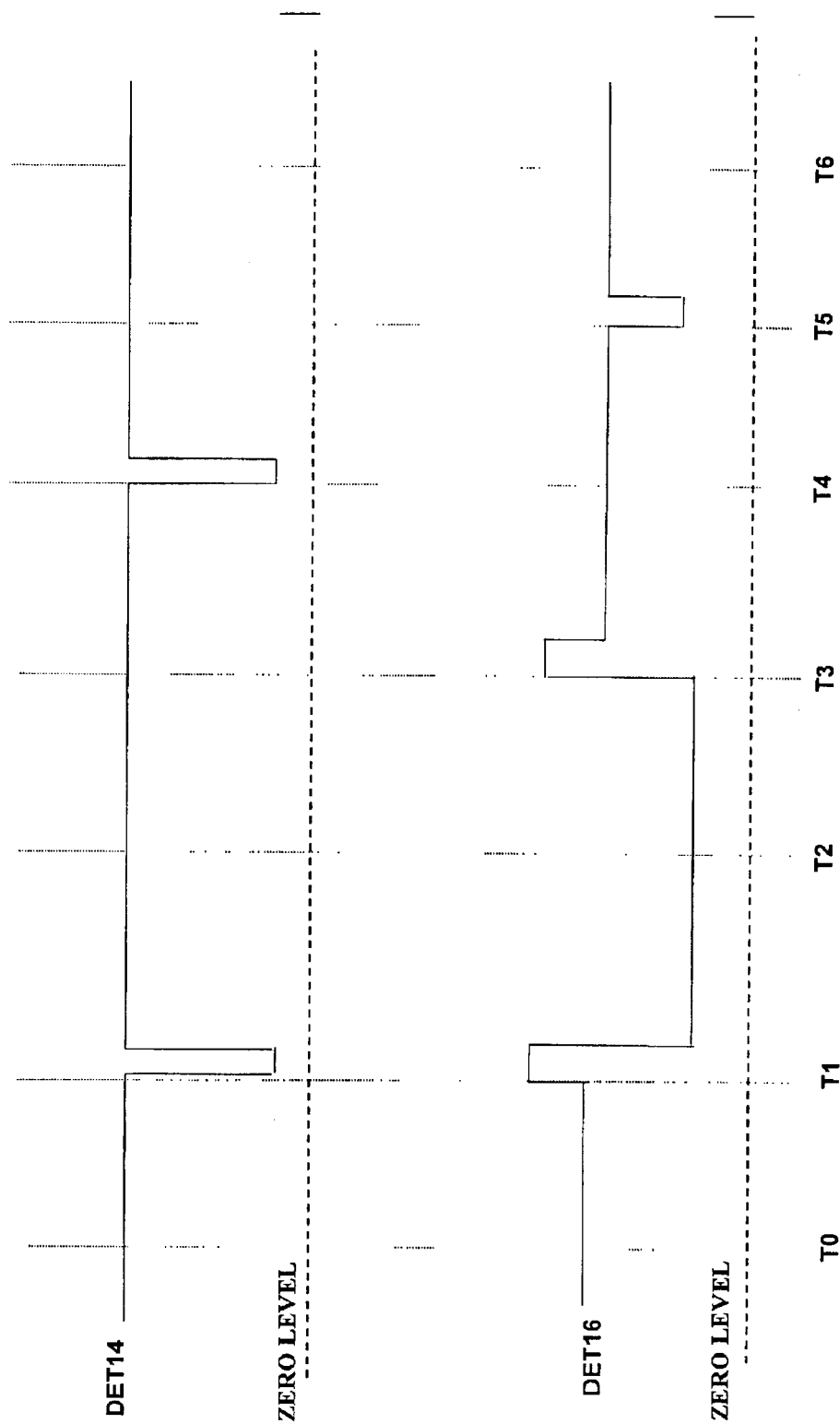
FIG. 2 is a timing diagram depicting the outputs of imaging subsystems 14 and 16 as the surface under test is moved over time.

Assuming illumination from above and a uniformly scattering surface 12, a timing diagram of light amplitudes received at detectors 14b (DET 14) and 16b (DET 16) at times T0–T6 described above is shown in FIG. 2. In the figure, the time scale is greatly exaggerated at the edges to provide clarity.

FIGS. 1A–1G and surface 12 are illustrative of detection and determination of simple steps in height, however, the present invention applies to detection of other features of varying shape. The only requirement is that the feature be of recognizable shape, for example a typical dust particle, a solder ball in a BGA (ball-gird-array), a vehicle or other structure in a field, etc. Due to the measurement by the imaging subsystem 14 of the reflective profile of various known shapes of defects and generally known shapes for design features, the variation in illumination as the surface passes by the optical imaging subsystems can be correlated to determine the location of the surface feature and the results compared between imaging subsystem 14 and imaging subsystem 16 to determine the height difference. In this way, complete 3D information is achieved for all surface features.

Moreover, the 3D information is acquired by imaging subsystem 16 only for the points of interest (i.e. the ones having a height change) while for constant height variations imaging subsystem 16 provides no signal. The use of imaging subsystem 16 to detect height changes creates a major data and processing reduction compared with a stereo vision method, since only one subsystem (imaging subsystem 14) acquires all in-plane surface information, while the other (imaging subsystem 16) acquires only height information and only for points of interest, when triggered. Moreover, the correlation between the imaging systems 14 and 16 is direct, time-dependent, while for a stereo vision system the correlation must be done after processing the entire image. The data reduction is a feature of the optical system of the present invention and is not a result of image processing. By way of example, an amount of information and time can be predetermined for detecting two high resolution images with existing area cameras used in stereo vision: for a typical high speed 2000×2000 pixel camera, data acquisition time is of the order of 100 milliseconds at present. Image acquisition will increase this time by at least a factor of 4. For the proposed system, the data from a 10,000-pixel high-speed line camera can be acquired in about 1/10,000 second, with synchronized image acquisition (since the second coordinate is provided by the scanning subsystem). Consequently, one can detect and acquire 10 million pixels/second with the fastest existing system (including a costly high-speed detector), while a system in accordance with the present invention can perform an identical function at 100 million pixels/second using a standard detector.

Further advantages arise in image processing according to the system of the present invention. Using the above-illustrated approach, image processing is greatly simplified by the techniques of the present invention. Rather than comparing two "shifted" images as required in stereo vision implementations and detecting specific changes embedded in a 2D image, the method of the present invention tracks changes occurring only at out-of-plane points of interest. The height range offered by the proposed method is limited only by the depth of field of the imaging subsystems (a limit present also in conventional techniques). Unlike the existing methods (triangulation or stereo vision) using area cameras where the height range is limited by the number of rows of the camera, the proposed method can measure with the same accuracy very small and very large height changes. Further, existing methods are highly non-linear over the measurable height range due to the intrinsic geometry exploited for making the height measurements. The proposed method is perfectly linear as shown in the formula and is limited only by either the accuracy of time measurement and ability to control the velocity of positioning subsystem 19 or by the ability to synchronize the signals from the imaging systems.

Finally, the present invention is advantageous in that while the basic resolution for conventional methods is related to pixel size (improved sometimes by complicated image processing algorithms), the present invention method is limited primarily by the scanning of the surface and the edge signal synchronization. Present positioners and position instrumentation are highly accurate, with resolutions ranging to fractions of micrometers. While a standard stereo vision technique, using a high resolution camera (roughly 200×2000 pixels), the height range for an observation angle of 45 degrees is approximately 4000:1 (considering the number of rows for the range and a pixel interpolation algorithm for the resolution). For the method of the present invention, the height range can be as large as several meters with a resolution as small as several micrometers, providing a dynamic range of $10^6$ or greater. Moreover, the system of the present invention is easily scalable.

Figure 3:
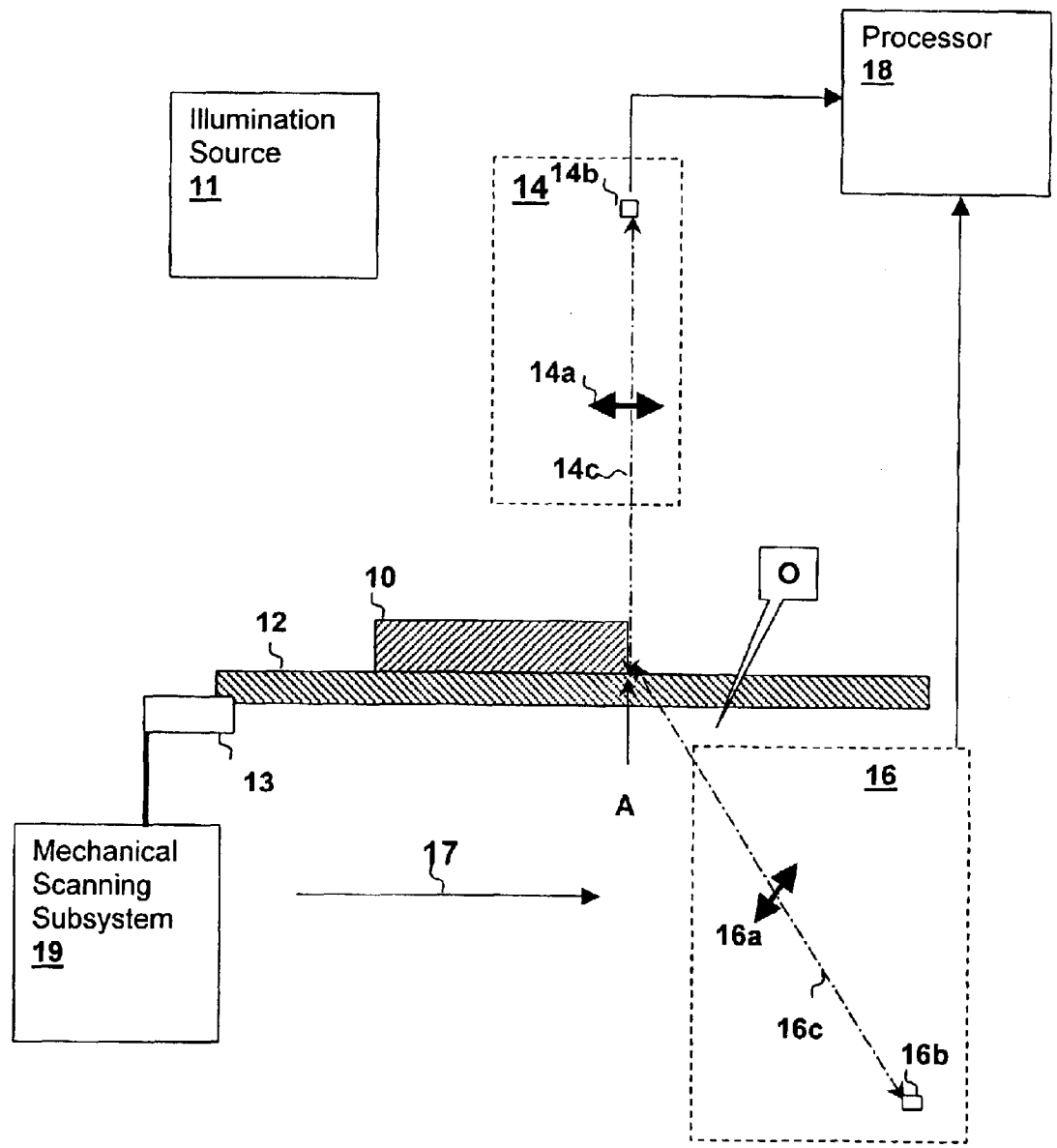
FIG. 3 is an illustration depicting a cross section of a surface under test by a system in accordance with an alternative embodiment of the invention.

As has been described, a scanning motion between the surface to be inspected and the detectors is required. What was shown is a contained system where the surface was scanned under the detectors. In further embodiments of the invention, there are applications such as profile mapping of large surfaces where the detection system would be translated as opposed to the surface to be inspected. Translation can be performed in a number of ways known to those skilled in the art. What is required is that the detection system be moved as a whole and that the reference dimensions between the detectors remain the same. An example is mounting the detection system to a movable vehicle and scanning objects while moving the vehicle. A second example is mounting the detection system to a rotating platform. Synchronized scanners can also be used to translate the image of the surface onto the detectors. In the synchronized scanner methods the synchronization can also be adjusted so as to move position O across a range of interest. In yet further embodiment of the invention, one or more of imaging systems may operate in transmission rather than reflection. Referring now to FIG. 3, a measurement system in accordance with an alternative embodiment of the invention is depicted. Imaging system 16 is operating in transmission while imaging system 14 is operating in reflection. Due to the time resolving nature of the systems of the present invention, the imaging systems are decoupled and therefore the relative amplitude of the signals and the relative specifications of the different imaging systems are not critical. For the same above-mentioned reasons, the illumination systems are also not critical. Features to be measured need only provide a signal with appropriate signal to noise ratios for each imaging system.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. An optical system for determining a height of a surface feature of a surface under test, comprising:
   a first imaging subsystem aligned at a first predetermined nonzero and non-perpendicular angle with respect to a surface under test for receiving a first line image crossing a direction of optical translation between said surface under test and said optical system and having a narrow field of view projecting a line of sight along said first predetermined angle toward said surface under test, whereby said first imaging system only receives light scattered along said line of sight by vertical projections of said surface under test;
   a second imaging subsystem aligned at a second predetermined angle with respect to said surface under test for receiving a second line image;
   a scanning subsystem for generating said optical translation; and
   a processor coupled to said first and second imaging subsystems for synchronizing said first image and said second image in time and computing said height of said surface feature in conformity with the deviations between said first image and said second image generated as the scanning subsystem moves an edge of said surface feature within the optical paths of said first and said second imaging subsystems.

2. The optical system of claim 1, wherein the scanning subsystem is a scanning table for moving said surface under test within the optical paths of said first and second imaging subsystems.

3. The optical system of claim 1, wherein the scanning subsystem is a head scanning subsystem for moving said first and said second imaging subsystems over said surface under test.

4. The optical system of claim 1, wherein the scanning subsystem is an optical scanning subsystem for synchronously moving an image of the surface under test within the optical paths of said first and second imaging subsystems.

5. The optical system of claim 1, wherein said processor comprises an edge detector for detecting edges of said surface feature and records a first position of said scanning subsystem when said edge is detected by one of said first imaging subsystem and a second position when said edge is detected by said second imaging subsystem.

6. The optical system of claim 5, wherein said processor further comprises a computation unit for computing said height of said surface feature in conformity with a difference between said first position and said second position scaled by the a trigonometric function of a difference between said first predetermined angle and said second predetermined angle.

7. The optical system of claim 6, wherein said processor is a digital numeric processor further comprising a memory for storing program instructions and data for executing program instructions from said memory, and wherein said program instructions comprise program instructions for:
   detecting edges of said surface feature and recording said first position of said scanning subsystem when said edge is detected by said first imaging subsystem and recording said second position of said scanning subsystem when said edge is detected by said second imaging subsystem; and
   computing said height of said surface feature according to the difference between said first position and second position scaled by said difference between said first predetermined angle and said second predetermined angle.

8. The optical system of claim 1, wherein said first imaging subsystem has an optical path normal to the plane of the surface under test, wherein the second imaging subsystem has an optical path aligned at a predetermined angle other than normal to the plane of the surface under test, and wherein said processor computes said height of said surface feature by determining a time interval corresponding to the time that said edge of said surface feature is within the optical path of said second imaging system during which said second imaging system detects substantially no light scattered from said surface during said interval.

9. The optical system of claim 1, wherein said optical system further determines a length of said surface feature, wherein said first imaging subsystem has an optical path normal to the plane of the surface under test, wherein the second imaging subsystem has an optical path aligned at a predetermined angle other than normal to the plane of the surface under test, and wherein said processor computes a length of said surface feature by determining a time interval corresponding to a difference between a time that said edge of said surface feature is within the optical path of said first imaging system and a second time that a second edge of said surface feature is within the optical path of said first imaging system.

10. The optical system of claim 1, wherein said optical system further determines a width of said surface feature, wherein said first imaging subsystem includes a pixel array oriented to image on a line perpendicular to said translation, and wherein said processor computes a width of said surface feature by processing an image produced by said pixel array.

11. The optical system of claim 1, wherein at least one of said first and said second imaging systems are oriented to detect light transmitted through said surface under test.

12. The optical system of claim 1, wherein said first imaging system further images said surface feature in a plane of said surface under test, while said second imaging subsystem is used in conjunction with said first imaging subsystem for performing said height computation.

13. An optical system for determining the height of a surface feature of a surface under test, comprising:
   a scanning subsystem for moving one of said surface under inspection or said first and second imaging subsystems; and
   means for determining a height of said surface feature in conformity with detected positions of edges of said surface feature.

14. A method for determining the height of a surface feature of a surface under test, comprising:
   moving said surface under test with respect to multiple line imaging subsystems disposed at predetermined angles and having narrow fields of view directed along corresponding lines-of-sight at said predetermined angles toward said surface under test for receiving light scattered from said surface under test;
   first detecting that an edge of said surface feature has passed within the line-of-sight of a first one of said multiple imaging subsystems;
   second detecting that said edge of said surface feature has passed within the line-of-sight of a second one of said multiple imaging subsystems; and
   computing said height in conformity with a result of said first detecting and said second detecting.

15. The method of claim 14, further comprising:
   in response to said first detecting detecting that said edge has passed within the optical path of said first imaging subsystem, first storing a first position of said surface under test; and
   in response to said second detecting detecting that said edge has passed within the optical path of said second imaging subsystem, second storing a second position of said surface under test.

16. The method of claim 14, further comprising in response to said second storing being complete, computing a height of said surface feature by calculating a difference between said first position and said second position and scaling said difference by a trigonometric function of the angular difference between optical paths of said first imaging subsystem and said second imaging subsystem to compute said height.

17. The method of claim 14, wherein said moving moves said surface under test while said imaging subsystems remain fixed.

18. The method of claim 14, wherein said moving moves said multiple imaging systems while said surface under test remains fixed.

19. The method of claim 14, wherein said moving moves an image of said surface under test within optical paths of said multiple imaging systems while said surface under test and said multiple imaging systems remain fixed.

20. The method of claim 14, wherein said first imaging subsystem has an optical path normal to the plane of the surface under test, and wherein the second imaging subsystem has an optical path aligned at a predetermined angle other than normal to the plane of the surface under test.

21. The method of claim 14, wherein said method further determines a length of said surface feature, wherein said first imaging subsystem has an optical path normal to the plane of the surface under test, wherein the second imaging subsystem has an optical path aligned at a predetermined angle other than normal to the plane of the surface under test, wherein said method further comprises third detecting that a second edge of said surface feature has passed within the optical path of said first imaging subsystem, and wherein said computer further computes said length in conformity with said first and third detecting.

22. The method of claim 14, wherein said method further determines a width of said surface feature, wherein said first imaging subsystem includes a pixel array oriented to image on a line perpendicular to said translation, and wherein said computing computes a width of said surface feature by processing an image produced by said pixel array.

23. The method of claim 14, wherein at least one of said first detecting and said second detecting detect changes in light transmitted through said surface under test.

* * * * *